(12) United States Patent
Lai et al.

(10) Patent No.: US 8,673,990 B2
(45) Date of Patent: Mar. 18, 2014

(54) PROCESS OF MAKING POLYESTER LATEX WITH BUFFER

(75) Inventors: Zhen Lai, Webster, NY (US); Chieh-Min Cheng, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 175 days.

(21) Appl. No.: 13/352,871

(22) Filed: Jan. 18, 2012

(65) Prior Publication Data

US 2013/0184392 A1 Jul. 18, 2013

(51) Int. Cl.
*C08J 9/28* (2006.01)
*C08F 299/04* (2006.01)
*C08F 283/00* (2006.01)

(52) U.S. Cl.
USPC ................ 521/69; 522/104; 524/457

(58) Field of Classification Search
USPC ............... 524/424, 457; 526/336; 521/69; 522/104
See application file for complete search history.

(56) References Cited

U.S. PATENT DOCUMENTS

| | | |
|---|---|---|
| 5,853,943 A | 12/1998 | Cheng et al. |
| 5,902,710 A | 5/1999 | Ong et al. |
| 5,910,387 A | 6/1999 | Mychajlowskij et al. |
| 5,916,725 A | 6/1999 | Patel et al. |
| 5,919,595 A | 7/1999 | Mychajlowskij et al. |
| 5,925,488 A | 7/1999 | Patel et al. |
| 5,977,210 A | 11/1999 | Patel et al. |
| 5,994,020 A | 11/1999 | Patel et al. |
| 6,063,827 A | 5/2000 | Sacripante et al. |
| 6,380,281 B1 * | 4/2002 | Gooch et al. ............. 523/500 |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 7,329,476 B2 | 2/2008 | Sacripante et al. |
| 7,547,499 B2 | 6/2009 | Veregin et al. |
| 7,858,285 B2 | 12/2010 | Sacripante et al. |
| 2010/0310979 A1 | 12/2010 | Ou et al. |
| 2010/0310983 A1 | 12/2010 | Ou et al. |

FOREIGN PATENT DOCUMENTS

EP 2261747 A3 * 6/2011

* cited by examiner

*Primary Examiner* — Michael Bernshteyn
(74) *Attorney, Agent, or Firm* — Oliff PLC

(57) ABSTRACT

Methods herein include mixing at least one polyester resin with at least one solvent to form a resin mixture, adding water to cause phase inversion and form a polyester latex, adding at least one buffering agent to the phase inverted mixture to stabilize the phase inverted mixture, and subsequent to the buffering agent addition, substantially removing the at least one solvent from the phase inverted mixture.

13 Claims, No Drawings

PROCESS OF MAKING POLYESTER LATEX WITH BUFFER

TECHNICAL FIELD

The present disclosure relates to a polyester latex and process for making the same, wherein the formulation exhibits improved stability with narrow particle size distribution and less latex sedimentation. The polyester latexes may be used to form toners in emulsion aggregation processes.

BACKGROUND

Emulsion aggregation (EA) is one of the many processes used for the preparation of toners. Emulsion aggregation toners may be used in forming print and/or xerographic images. Emulsion aggregation techniques may first involve the formation of a latex of the resin particles by heating the resin using a batch or semi-continuous emulsion polymerization, as disclosed in, for example, U.S. Pat. No. 5,853,943, the disclosure of which is hereby incorporated by reference in its entirety. Other examples of emulsion/aggregation/coalescing processes for the preparation of toners are illustrated in U.S. Pat. Nos. 5,902,710; 5,910,387; 5,916,725; 5,919,595; 5,925,488; 5,977,210; 5,994,020; and 7,858,285, the disclosures of each of which are hereby incorporated by reference in their entirety.

Polyester EA ultra low melt (ULM) toners have been prepared utilizing amorphous and crystalline polyester resins as illustrated, for example, in U.S. Pat. No. 7,547,499, the disclosure of which is hereby incorporated by reference in its entirety. The EA process requires polyesters to be first formulated into latex emulsions, for example, by solvent containing batch processes, such as solvent flash emulsification and/or solvent-based phase inversion emulsification (PIE).

In PIE, polyester resins are typically converted into a latex by dissolving the polyester resin in at least one organic solvent, which then needs to be removed, sometimes referred to as skipped, via a vacuum distillation process for safety and environmental concerns. However, due to stability issues during the PIE process and during transportation and storage, product loss can occur. For example, a polyester latex may gel inside the reactor and thus not form, or may form but settle out during transportation and storage. Accordingly, what is desired is an improved PIE process for latex production in which the polyester latex is reliably produced and in which the resulting latex has good stability.

SUMMARY

The above and other objects are achieved herein, wherein in embodiments, the present disclosure describes a process comprising mixing at least one polyester resin with at least one solvent to form a resin mixture, adding water to cause phase inversion and form a polyester latex, adding at least one buffering agent to the phase inverted mixture to stabilize the phase inverted mixture, and subsequently substantially removing the at least one solvent from the phase inverted mixture.

In another aspect of the present disclosure, a process comprises mixing at least one polyester resin with at least one solvent to form a mixture, phase inverting the mixture by adding water, buffering the phase inverted mixture, preventing foaming of the buffered phase inverted mixture by using a defoaming agent, and following phase inverting, substantially removing the at least one solvent from the phase inverted mixture.

A crystalline polyester latex is also described in which the latex has a shelf-life stability of at least 3 months, and contains less than 600 ppm of solvent, which is prepared by a process including mixing at least one polyester resin with at least one solvent to form a mixture, phase inverting the mixture using water, stabilizing the phase inverted mixture with a buffering agent; and subsequent to the buffering agent addition substantially removing the at least one solvent from the phase inverted mixture.

EMBODIMENTS

The processes herein include using a buffer, sometimes also referred to herein as buffering agent, for a more effective process of making polyester latexes via solvent-based phase inversion emulsification of polyesters. These polyester latexes, in turn, may be utilized for the preparation of low melt polyester toners, for example, in an EA process. The present disclosure provides processes for forming a polyester latex with significantly reduced and/or no gelling and sedimentation, and thus less product loss and significantly improved stability, compared to current phase inversion processes in which no buffering agent is included.

In embodiments, the process includes mixing at least one polyester resin with at least one solvent to form a resin mixture, adding water to cause phase inversion and form a polyester latex, adding at least one buffering agent to the phase inverted mixture to stabilize the phase inverted mixture, and subsequent to the addition of the buffering agent, substantially removing the at least one solvent from the phase inverted mixture.

The processes herein are able to achieve a polyester latex that has a shelf-life stability of at least 3 months. This polyester latex has remarkably improved stability with much less solvent compared to polyester latexes prepared in a similar process but lacking addition of any buffering agents following phase inversion. Without the addition of a buffering agent, it was found that the crystalline polyester latex may become unstable at the late stage of distillation during the phase inversion emulsification process. For example, the latex may become a gel inside the reactor once the residual level of solvents falls below 600 ppm. This results in a whole batch loss and a lot of effort needed to clean up the reactor. In other cases, the latex survives the distillation stage, but latex gelation may still occur during storage.

Shelf-life stability can be assessed through the amount of sediment of gelation of the latex during storage under conditions of room temperature and pressure. A typical centrifugation method can be used to simulate storage and accelerate the sediment settling process. In the procedure, two weeks of storage was simulated via an IEC Centrifuge at 3,120 G-force for 50 seconds. The samples were removed and the amount of sediment was then determined. The latex was considered stable if the amount of measured sediment of latex after centrifugation is less than 1 weight percent of the total latex weight.

Any polyester resin may be utilized in making the polyester latexes in the present disclosure. The resin may be an amorphous resin, a crystalline resin, and/or a combination thereof. The resin may be a polyester resin, such as described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

One, two, or more polyester resins may be used. Where two or more resins are used, the resins may be in any suitable ratio (e.g., weight ratio) such as, for example of from about 1% (first resin):99% (second resin) to about 99% (first resin):1% (second resin), in embodiments from about 10% (first resin):90% (second resin) to about 90% (first resin):10% (second resin). Where the polyester resin includes an amorphous polyester resin and a crystalline polyester resin, the weight ratio of the two resins may be from about 99% (amorphous polyester resin): 1% (crystalline polyester resin), to about 1% (amorphous polyester resin): 99% (crystalline polyester resin).

The polyester resin may possess acid groups which, for example, may be present at the terminal of the resin. Acid groups which may be present include carboxylic acid groups and the like.

In embodiments, the resin may be a polyester resin having an acid value from about 2 mg KOH/g of resin to about 200 mg KOH/g of resin, or from about 5 mg KOH/g of resin to about 30 mg KOH/g of resin. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

The polyester resin may be a polyester resin formed by reacting a diol with a diacid or diester in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. Examples of diols which may be utilized in generating an amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The aliphatic diol may be, for example, used in an amount of from about 40 to about 60 mole percent, from about 42 to about 55 mole percent, or from about 45 to about 53 mole percent, and a second diol can be selected in an amount of from about 0 to about 10 mole percent, or from about 1 to about 4 mole percent of the resin.

Examples of organic diacids or diesters including vinyl diacids or vinyl diesters selected for the preparation of crystalline polyester resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid may be used in an amount of, for example, from about 40 to about 60 mole percent, from about 42 to about 52 mole percent, or from about 45 to about 50 mole percent, and a second diacid can be selected in an amount of from about 0 to about 10 mole percent of the resin.

Specific examples of suitable crystalline polyester resins include, for example poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Suitable crystalline polyester resins which may be utilized, optionally in combination with an amorphous polyester resin as described below, include those disclosed in U.S. Pat. No. 7,329,476, the disclosure of which is hereby incorporated by reference in its entirety. A suitable crystalline polyester resin may include a resin formed of, for example, ethylene glycol and a mixture of dodecanedioic acid, and fumaric acid comonomers. For example, a poly(propoxylated bisphenol A co-fumarate) resin may be combined with a crystalline resin, for example poly(dodecandioicacid-co-nonanediol), to form a latex emulsion.

The crystalline resin may be present, for example, in an amount of from about 5 to about 50 percent by weight of the polyester resin mixture, such as from about 10 to about 35 percent by weight of the resin mixture. The crystalline resin can possess various melting points of, for example, from about 30° C. to about 120° C., or, from about 60° C. to about 90° C. The crystalline resin may have an average molecular weight (Mw), as measured by gel permeation chromatography (GPC) using polystyrene standards of, for example, from about 5,000 to about 90,000.

An unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, for example, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof. An example of a linear propoxylated bisphenol A fumarate resin which may be utilized is available under the trade name SPAR11 from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C.

The amorphous resin may be present, for example, in an amount of from about 30 to about 90 percent by weight of the formulation, or from about 40 to about 80 percent by weight of the formulation. The amorphous resin or combination of amorphous resins utilized in the latex may have a glass transition temperature of from about 30° C. to about 80° C., such as from about 35° C. to about 70° C. The resin(s) utilized in the latex may have a melt viscosity of from about 10 to about 1,000,000 Pa*S at about 130° C., such as, from about 50 to about 100,000 Pa*S.

In the processes herein, the polyester resin is mixed with an organic solvent or solvent mixture to produce a homogenous resin mixture. The resin mixture may be agitated and/or heated in order to decrease the time necessary to produce a homogenous resin mixture. For example, the resin may be heated to a temperature necessary to dissolve or speed the dissolution of the resin in the solvent, for example, from about 30° C. to about 120° C., or form about 60° C. to about 90° C.

The present process includes mixing at least one polyester resin, which may be at an elevated temperature, with at least one organic solvent. The polyester resin may be an amorphous resin and an elevated temperature for mixing may be a temperature above the glass transition temperature of the polyester resin. In other embodiments, the polyester resin may be a crystalline polyester resin and the elevated temperature for mixing may be a temperature above the melting point of the polyester resin. In further embodiments, the polyester resin may be a mixture of amorphous and crystalline polyester resins and the temperature for mixing may be above the glass transition temperature of the mixture.

Any suitable organic solvent may be used to dissolve the resin and form the mixture. For example, polyols of the formula $C_nH_{2n+1}OH$, ketones of the formula $C_2(H_{2n+2})CO$, acetates of the formula $C_nH_{2n+2}COCH_3$, where n is greater than or equal to 1, esters, ethers, amines, and combinations thereof may be used. Suitable organic solvents include, for example, methanol, ethanol, propanol, isopropanol, butanol, ethyl acetate, methyl ethyl ketone, tetrahydrofuran and the like, and combinations thereof. In embodiments, the organic solvent may be immiscible in water and may have a boiling point of from about 30° C. to about 120° C. The solvent may be used in an amount of, for example, from about 1 wt % to about 100 wt % of the resin, from about 10% wt to about 90% wt of the resin, or from about 25% wt to about 85% wt of the resin, where the solvent to resin ratio ranges from about 0.3 to about 3, or from about 0.5 to about 1.5.

After mixing the polyester resin with the solvent, but before phase inversion, the resin mixture may optionally be mixed with a base or neutralizing agent, optionally at an elevated temperature. The neutralizing agent may, for example, be a solid or added in the form of an aqueous solution.

The neutralizing agent may be used to neutralize a base or an acid, for example, the acid groups of the polyester resins, so a neutralizing agent herein may also be referred to as a "basic neutralization agent." Any suitable basic neutralization agent may be used in accordance with the present disclosure. For example, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, organoamines such as triethyl amine, and combinations thereof.

The neutralizing agent may be utilized so that it is present in an amount of from about 0.001% by weight to 50% by weight of the resin, from about 0.01% by weight to about 25% by weight of the resin, or from about 0.1% by weight to 5% by weight of the resin.

The neutralizing agent may be added at once in bulk, added in stages, or metered, for example at a rate of from about 0.01% wt % to about 10 wt % about every 10 minutes, from about 0.5 wt % to about 5 wt % about every 10 minutes, or from about 1 wt % to about 4 wt % about every 10 minutes. The rate of addition of the neutralizing agent need not be constant, and can be varied.

The neutralizing agent may, for example, be added in the form of an aqueous solution. In addition, prior to addition, the neutralizing agent may be at any suitable temperature, including room temperature (about 20° C. to about 25° C.), or an elevated temperature, for example from about 30° C. to about 120° C., or form about 60° C. to about 90° C.

Utilizing the above basic neutralization agent in combination with a polyester resin possessing acid groups, a neutralization ratio of from about 50% to about 300% may be achieved, from about 70% to about 200%, or from about 100% to about 120%. The neutralization ratio may be calculated, for example, by using the following equation:

Neutralization ratio in an equivalent amount of 10% $NH_3$/(resin (g)*resin acid value*0.303*0.01).

The addition of the basic neutralization agent may thus raise the pH of the mixture including a resin possessing acid groups to be about 5 to about 14, such as to a pH of about 6 to about 11. The addition of the neutralizing agent may be useful, for example, where the polyester resin utilized possesses acid groups. The neutralizing agent may neutralize the acidic groups of the resin, thereby enhancing the subsequent formation of the phase-inverted emulsion and formation of particles suitable for use in forming toner compositions.

For the phase inversion process, the amorphous and/or crystalline polyester resin is desirably dissolved in a low boiling organic solvent, which solvent is immiscible in water, such as ethyl acetate, or methyl ethyl ketone, or any other suitable solvent, at a concentration of, for example, from about 1 wt % to about 75 wt % of resin in solvent, or from about 5 wt % to about 60 wt %. The resin mixture may be heated to a temperature of, for example, about 25° C. to about 90° C., or from about 30° C. to about 85° C. The heating need not be held at a constant temperature, but may be varied. For example, the heating may be slowly or incrementally increased during heating until a desired temperature is achieved.

While the temperature is maintained in the aforementioned range, water is added to the mixture to cause phase inversion. The water may be added in any form, for example as deionized water, as an aqueous solution, for example as an aqueous solution with the neutralization agent, or any other aqueous solution. The addition of a sufficient amount of water forms a phase inverted latex. The water to resin weight ratio is, from about 1 to 80, or from about 5 to about 50. The water is desirably metered into the resin mixture, for example added to the mixture at a rate of about 0.1% to about 10% of resin weight of water per minute, or from about 0.5% to about 4% of resin weight per minute. The water may be warmed before addition to the resin mixture to a temperature from about 25° C. to about 80° C., or from about 30° C. to about 70° C.

The water may be added as part of an aqueous solution until phase inversion occurs, or a portion of the water may be added as part of an aqueous solution followed by a separate addition of additional water to cause phase inversion. The total amount of water added to the resin mixture is for example, from about 1 wt % to about 25 wt % of the resin, such as from about 5 wt % to about 20 wt %.

In an example embodiment, an aqueous solution of the neutralization agent, and an optional surfactant, may be metered into a heated resin mixture at least until phase inversion is achieved, or the neutralization agent and optional surfactant may be metered into the heated mixture to neutralize the solution followed by an addition of a water, for example, deionized water, until phase inversion is achieved.

Where the process further includes adding water after the addition of, for example, a basic neutralization agent and optional surfactant, the water may be metered into the mixture at a rate of, for example, about 0.01 wt % to about 10 wt % about every minute, from about 0.5 wt % to about 5 wt % about every minute, or from about 1 wt % to about 4 wt % every 10 minutes. The rate of water addition need not be constant, and can be varied.

In embodiments, a process of the present disclosure may include heating one or more ingredients of a polyester resin composition to an elevated temperature, stirring the resin composition, and, while maintaining the temperature at the elevated temperature, optionally adding the neutralizing agent, and optional surfactant into the mixture to enhance formation of the emulsion including a disperse phase and a continuous phase including the resin composition, and continuing to add the neutralizing agent, optional surfactant and/or water until phase inversion occurs to form the phase inverted emulsion.

Although the point of phase inversion may vary depending on the components of the emulsion, the temperature of heating, the stirring speed, and the like, phase inversion may occur when water has been added so that the resulting resin is present in an amount from about 5 wt % to about 70 wt % by weight of the emulsion, from about 20 wt % to about 65 wt % by weight of the emulsion, or from about 30 wt % to about 60 wt % by weight of the emulsion.

At phase inversion, polyester resin particles become emulsified and dispersed within the aqueous phase. That is, an oil-in-water emulsion of the polyester resin particles in the aqueous phase is formed. Phase inversion may be confirmed by, for example, measuring via any of the techniques within the art.

Stirring may be utilized to enhance formation of the phase inverted emulsion. Any suitable stirring device may be utilized. The stirring need not be at a constant speed, and may be varied. For example, as the heating of the mixture becomes more uniform, the stirring rate may be increased. The stirring may be at from about 10 revolutions per minute (rpm) to about 5,000 rpm, from about 20 rpm to about 2,000 rpm, or from about 50 rpm to about 1,000 rpm. A homogenizer (that is, a high shear device), may be utilized to form the phase inverted emulsion, but in examples, the process of the present disclosure may take place without the use of a homogenizer. Where utilized, a homogenizer may operate at a rate of from about 3,000 rpm to about 10,000 rpm.

Following phase inversion, additional surfactant, water, and/or aqueous alkaline solution may optionally be added. For example, additional water may be added to dilute the phase inverted emulsion, although this is not required. Following phase inversion, the phase inverted emulsion may be cooled to room temperature (about 20° C. to about 25° C.), if necessary.

The processes of the present disclosure may include adding a surfactant to the resin, for example, before neutralization and/or during the addition of the phase inversion agent, thereby enhancing formation of the phase inverted emulsion. Where utilized, one, two, or more surfactants may be used. The surfactants may be selected from ionic surfactants and nonionic surfactants. Anionic surfactants and cationic surfactants are encompassed by the term "ionic surfactants." The surfactant may, for example, be added as a solid or as a concentrated solution with a concentration of from about 10% to about 100% (pure surfactant) by weight, or from about 15% to about 75% by weight. The surfactant may be utilized so that it is present in an amount of from about 0.01% to about 20% by weight of the resin, from about 0.1% to about 10% by weight of the resin, or from about 1% to about 8% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN®, NEOGEN™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA210™, ANTAROX 890™, and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing nonionic surfactants may be utilized in embodiments.

In embodiments, the process of the present disclosure may include adding an anti-foam agent or defoamer to the phase inverted or resin mixture according to the process and anti-foam agents or defoamers disclosed in U.S. Patent Application Publication No. 2010/0310983, incorporated herein by reference in its entirety. A defoaming agent prevents foaming of the phase inverted mixture.

The processes of the present disclosure include adding a buffering agent to the phase inverted mixture. Buffering agents improve the stability and economics for making the polyester dispersions. Without being limited, it is theorized that the buffering agent adjusts the ionic strength of the mixture, thereby increasing colloidal particle stability and increasing the stability of the electrostatic layer.

The buffering agent may be added to the phase inverted mixture, from about 0.01 to about 5.0 parts per hundred of the mixture based on the concentration of the resin, for example, from about 0.05 to about 2.5 parts per hundred of the mixture, or from about 0.1 to about 1 parts per hundred. Suitable buffering agents that may be utilized for the formulation of the present disclosure may include any salt, organic compounds, any weak acid with its conjugate base, any weak base with its conjugate acid, and mixtures thereof.

For example, suitable buffering agents which may be utilized include salts of alkali metals, alkaline earth metals, for example sodium chloride, or potassium chloride.

Suitable organic compounds include, for example, carbonates of alkali metals, bicarbonates of alkali metals, sulfites of alkali metals, carbonates of alkaline earth metals, bicarbonates of alkaline earth metals, sulfites of alkaline earth metals, for example, potassium carbonate, sodium bicarbonate, sodium sulfite and the like, and other organic compounds such as tris(hydroxymethyl)aminomethane ("TRIS"), Tricine, Bicine, Glycine, (4-(2-hydroxyethyl)-1-piperazineethanesulfonic acid ("HEPES"), triethalamine hydrochloride, 3-(N-morpholino)propanesulfonic acid ("MOPS").

In embodiments, a weak acid with its conjugate base, or a weak base with its conjugate acid, may be utilized as the buffering agent. A weak acid is an acid that partially ionizes in an aqueous solution and the conjugate base is the anion of the weak acid. A weak base is a base that partially ionizes in an aqueous solution and the conjugate acid is the cation of the weak base. Examples of weak acids include, for example acetic acid, oxalic acid, lactic acid, citrates and the like. Examples of weak bases include ammonias, acetylacetone, methylamine, and the like.

The above-mentioned buffering agent may be employed alone or in a mixture of two or more thereof. The buffering agent may be added as an aqueous solution or as a solid. The buffering agent may be incrementally added to the resin mixture.

After addition of a buffering agent to the phase inverted mixture, the organic solvent of the resin mixture is substantially removed, for example, by distillation, such as vacuum distillation. Vacuum distillation is a method of distillation whereby the pressure above the liquid mixture to be distilled is reduced to less than its vapor pressure causing evaporation of the most volatile liquid. This distillation method works on the principle that boiling occurs when the vapor pressure of a liquid exceeds the ambient pressure. Vacuum distillation may be used with or without heating the phase inverted mixture.

After distillation, some residual solvent may remain in the final latex. The residual solvent in the final latex ideally contains less than 600 ppm, such as less than about 500 ppm, less than about 300 ppm, or less than 100 ppm of solvent.

This process offers several advantages over current solvent-based processes for the formation of emulsions both at the laboratory and industrial scale. The process of the adding a buffering agent may increase the stability during the transportation and storage by preventing sedimentation and prevent the latex mixture from gelling inside the reactor. In addition, the process of the present disclosure for the production of polyester latex emulsions using PIE permits high throughput experimental screening, high throughput production rates, eliminates or minimizes wasted product, greatly reduces time to market for the latex production, and produces latexes with more efficient solvent stripping.

The emulsified resin particles in the aqueous medium may have a submicron size, for example of about 1 µm or less, about 500 nm or less, for example, from about 10 nm to about 500 nm, from about 50 nm to about 400 nm, from about 100 nm to about 300 nm, or about 200 nm. Adjustments in particle size can be made by modifying the ratio of water to resin flow rates, the neutralization ratio, solvent concentration, and solvent composition. Distillation with stirring of the organic solvent may be performed to provide the polyester resin emulsion particles with an average diameter size of, for example, from about 50 nm to about 250 nm, or from about 120 to about 180 nm.

The polyester emulsions may also have a high product yield by reducing reactor fouling and increasing reactor loading. Accordingly, a clean polyester dispersion with less residual solvents is produced. In addition, the final latex produced by the process may be used to form toner particles in any emulsion-aggregation process known in the art.

EXAMPLES

Example 1

Preparation of Crystalline Polyester Latex with Buffer

A 2 L-scale phase inversion emulsification (PIE) process was developed for screening of buffer efficiency. About 10 wt % of a high molecular-weight polyester resin, crystalline poly(dodecandioicacid-co-nonanediol), about 6.0 wt % of methyl ethyl ketone (MEK) and about 1 wt % of 2-propanol (IPA) were added to a glass reaction vessel, heated up to about 75° C., and allowed to dissolve. The resin liquid was then cooled to 60° C. An ammonia solution with a neutralization ratio of 114% was added to the resin liquid over a period from about 5 minutes to about 10 minutes under sufficient mixing. The mixture was allowed to mix for an additional 10 to 30 minutes. A phase inversion agent, about 30 wt % of resin weight of warm water, at about 60° C., was added to the resin mixture at a rate of about 2.2% of resin weight per minute. Latex was made when the addition of the water induced phase inversion from water-in-oil to oil-in-water, resulting in a uniform dispersion of polyester latex particles in water.

Before vacuum distillation, a solution of about 0.1 parts per hundred to about 1 part per hundred, based on the concentration of resin, of sodium bicarbonate ($NaHCO_3$) was added as a buffer to the reactor at a rate of about 2.2% of resin weight per minute over about 5 minutes. The reactor was then heated to about 60° C. Once the reactor reached a temperature of about 55° C., a vacuum was applied to the reactor until a vacuum of about 65 mm of Hg was achieved after about 45 minutes.

During distillation, defoamer Tego Foamex 830™ was incrementally added, up to about 700 parts per million (ppm), through a charge line on top of the reactor. Samples were taken during distillation, and the residual MEK and IPA levels were measured by gas chromatography. The final latex had a residual MEK of less than about 20 ppm and residual IPA of less than about 80 ppm. The latex was stable, with a particle size a particle size of about 150 nm and a solids content of about 35 weight %.

The final latex was tested for % of sedimentation and stability against shear using a kitchen blender (Oster 12 speed blender) at the lowest speed setting. The test results are summarized in Table 1.

Comparative Example 1

Preparation of Crystalline Polyester Latex without Buffer

A polyester latex was prepared using the same formulation and process conditions described in Example 1, except that no buffer was added before distillation. Distillation was stopped early, when the residual amount of MEK and IPA was about 800 ppm. The final latex was tested for % of sedimentation and stability against shear using a kitchen blender (Oster 12 speed blender) at the lowest speed setting. The test results are summarized in Table 1.

Comparative Example 2

Preparation of Crystalline Polyester Latex without Buffer

A polyester latex was prepared using the same formulation and process conditions described in Example 1, except that no buffer was added before distillation. Distillation was attempted to remove additional solvent from Comparative Example 1, but it was found that the latex gelled inside the reactor when the residual MEK and IPA was about 600 ppm.

Example 2 demonstrates that the latex gels in the reactor when the residual solvents drop near 600 ppm, thus yielding no final latex.

Furthermore, Example 1 and Comparative Example 1 indicate that the buffer does not affect the particle size and size distribution of the final latex, but does improve stability of the final latex. The latex particle size was characterized by utilizing a Honeywell MICROTRAC® UPA 150 light scattering instrument. The size distribution is the ratio of weight average size (MV) to the number average size (MN). For example, the % of latex sedimentation decreased and time to gelation under shear increased in Example 1 (with buffer) when compared to a similar sample with no buffer (Comparative Example 1).

Example 2

Emulsion Aggregation (EA) Particle Formation and Toner Properties

A polyester dispersion was doped with about 0.5 pph $NaHCO_3$ based on crystalline polyester resin and converted to particles in a 20-gallon reactor using an EA particle process. The doped polyester dispersion of Example 1 comprised the same characteristics as that of a normal polyester dispersion without buffer, as shown below in Table 2. Specifically, toner particles having no buffer and toner particles having

TABLE 1

Final Latex Properties

| Sample ID | Buffer $NaHCO_3$ (pph) | Final Latex Resulted | Residual MEK (ppm) | Residual IPA (ppm) | Particle Size (nm) | Size Distribution (mv/mn) | Time To gelation under shear (seconds) | % Sedimentation |
|---|---|---|---|---|---|---|---|---|
| Latex Example 1 | 0.5 | Yes | 20 | 80 | 150 | 1.61 | 90 | 0.15 |
| Latex Comparative Example 1 | 0 | Yes | 45 | 750 | 153 | 1.72 | 60 | 0.48 |
| Latex Comparative Example 2 | 0 | No, latex gelled during distillation | | | | | N/A | |

The results in Table 1 indicate that the addition of buffer to the phase inverted mixture before distillation improves stability of the latex and prevents gelling of the latex. For example, without the addition of buffer, Comparative buffer possessed very similar properties, including Number Average Geometric Size Distribution (GSDn), Volume Average Geometric Size Distribution (GSDv), and Circularity (Cir.).

TABLE 2

Comparison of Black Parent Particle/Toner Properties

| Samples | CPE latex with buffer | Particle Size (μm) | GSDv | GSDn | Cir. | Particle Tribo (B zone) | Toner Tribo (A zone) | Toner Tribo (B zone) | Toner Tribo (J zone) | Residual ions (ppm) | T½ by Shimadzu (° C.) |
|---|---|---|---|---|---|---|---|---|---|---|---|
| Toner Example 1 | Yes | 5.64 | 1.20 | 1.22 | 0.972 | 66 | 28.6 | 48.6 | 56.7 | 1150 | 96.5 |
| Toner Comparative Example 1 | No | 5.61 | 1.20 | 1.22 | 0.971 | 65 | 27.0 | 49.0 | 57.0 | 1165 | 96.4 |

Particles made from doped polyester dispersion were further converted to toner particles with additives and evaluated. The results summarized in Table 2 indicate that a toner produced in accordance with the present disclosure contains similar properties to a toner produced using a latex without the addition of buffer. Toner Example 1 was produced from Latex Example 1 of Table 1, and Toner Comparative Example 1 was prepared from Latex Comparative Example 1. See Table 1 and 2.

The characteristics of the toner particles may be determined by any suitable technique and apparatus. GSDv and GSDn were measured by means of a measuring instrument such as a Beckman Coulter Multisizer 3, operated in accordance with the manufacturer's instructions. Representative sampling occurred as follows: a small amount of toner sample, about 1 gram, was obtained and filtered through a 25 micrometer screen, then put in isotonic solution to obtain a concentration of about 10%, with the sample then run in a Beckman Coulter Multisizer 3. Circularity was measured with, for example, a Sysmex FPIA 2100 analyzer.

Toners produced in accordance with the present disclosure possessed similar tribo characteristics when exposed to extreme relative humidity (RH) conditions. The low-humidity zone (J-zone) is about 70° F./10% RH, while the high humidity zone (A-zone) is about 80° F./80% RH. In addition, the tribo of toners made from polyester latexes derived from the processes of the present disclosure have similar characteristics in ambient conditions (B-zone) of about 70° C./50% RH.

The residual ions of the toner particles are measured by instrumental elemental analysis with Inductively Coupled Plasma (ICP) Optical Emission Spectroscopy. 0.25 grams of each sample were placed into separate platinum crucibles. 0.6 grams of 50/50 Lithium Tetraborate/Lithium Metaborate flux is added to the samples. The samples are heated to flux temperature of 300° C. for 1 hr, 600° C. for 4 hrs, or 950° C. for 40 min. 15 ml of 50% HCl is added to the samples and the samples are heated on a hot plate until dissolved. The samples are transferred to 100 mL plastic volumetrics and 0.5 mL of concentrated HF is added to the samples. 7.5 mL of 4% $H_3BO_3$ solution is added to neutralize any excess HF and let stand for at least one hour. After standing, 1 mL of 5% Triton X-100 is added as a wetting agent and brought to mark using DI water. Samples are analyzed on the TJA IRIS ICP.

The softening point and melt flow behavior of toners is determined using a Shimadzu CFT500. Data is reported in terms of softening point (Ts); the point at which the material begins to flow (Tfb) and the point at which one half of the material has been extruded, $T^{1/2}$. Approximately 1.6 grams of the samples is separately pressed into pellets at 5000 lbs pressure and analyzed using a Shimadzu CFT-500D capillary flow tester with 1.0 mm×1.0 mm die and 30 kg of weight. The sample is placed in the instrument at 40° C. and heated at about 3° C./minute to 140° C.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method comprising:
    mixing at least one polyester resin with at least one solvent to form a resin mixture;
    adding water to cause phase inversion and form a polyester latex;
    adding at least one buffering agent to the phase inverted mixture to stabilize the phase inverted mixture; and
    subsequent to the buffering agent addition, substantially removing the at least one solvent from the phase inverted mixture, wherein before the phase inversion, a neutralizing agent is added to the resin mixture.

2. The method according to claim 1, wherein the at least one solvent is selected from the group consisting of ketones of the formula $(C_nH_{2n+2})CO$, polyols of the formula $C_nH_{2n+1}OH$, acetates of the formula $C_nH_{2n+2}OCOCH_3$, or mixtures thereof, wherein n is greater than or equal to 1.

3. The method according to claim 1, wherein the at least one polyester resin is a crystalline polyester resin, or a mixture of a crystalline polyester resin and an amorphous polyester resin, and wherein the solvent to resin weight ratio in the resin mixture is from about 0.3 to about 3.

4. The method according to claim 1, wherein the neutralizing agent is added as an aqueous solution, the water of the aqueous solution being the water causing the phase inversion.

5. The method according to claim 1, wherein the water is added as deionized water, or as an aqueous solution containing water, and wherein the water to resin weight ratio following addition is from about 5 to about 50.

6. The method according to claim 1, wherein the at least one buffering agent is selected from the group consisting of a buffer or a mixture of buffers, and wherein a concentration of the buffer is from about 0.01 to about 5 parts per hundred of the mixture.

7. The method according to 6, wherein the buffer is selected from the group consisting of at least one salt, at least one solution of at least one weak acid and at least one conjugate base, at least one solution of at least one weak base and at least one conjugate acid, or mixtures thereof.

8. The method according to claim 1, wherein a surfactant is added before or after phase inversion, and wherein a defoaming agents added after phase inversion.

9. A method comprising:
    mixing at least one polyester resin with at least one solvent to form a mixture;
    phase inverting the mixture by adding water;
    buffering the phase inverted mixture;
    preventing foaming of the buffered phase inverted mixture by using a defoaming agent; and
    subsequent to the buffering, substantially removing the at least one solvent from the phase inverted mixture.

10. The method according to claim 9, wherein the buffering of the phase inverted mixture occurs from the addition of at least one buffer.

11. The method according to claim 10, wherein the at least one buffer is mixed with the phase inverted mixture before removing the at least one solvent from the phase inverted mixture.

12. The method according to claim 9, wherein, before phase inversion occurs, neutralizing the mixture with a neutralization agent.

13. The method according to claim 9, wherein the substantially removing the at least one solvent occurs by distillation to less than 600 ppm of the solvent.

* * * * *